(12) United States Patent
Boyd et al.

(10) Patent No.: US 7,725,403 B2
(45) Date of Patent: May 25, 2010

(54) METHOD AND SYSTEM TO VERIFY A TRANSACTION

(75) Inventors: Mark J. Boyd, Mountain View, CA (US); Rolf Skyberg, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/634,439

(22) Filed: Dec. 6, 2006

(65) Prior Publication Data
US 2007/0233611 A1 Oct. 4, 2007

Related U.S. Application Data

(60) Provisional application No. 60/755,205, filed on Dec. 30, 2005.

(51) Int. Cl.
*G06F 17/60* (2006.01)
(52) U.S. Cl. .............................. 705/65; 705/67; 705/64
(58) Field of Classification Search ................... 705/65, 705/64, 67
See application file for complete search history.

(56) References Cited

U.S. PATENT DOCUMENTS

| | | | |
|---|---|---|---|
| 2002/0198848 A1* | 12/2002 | Michener | 705/75 |
| 2004/0073688 A1* | 4/2004 | Sampson | 709/229 |
| 2005/0182684 A1* | 8/2005 | Dawson et al. | 705/26 |
| 2006/0129502 A1* | 6/2006 | Pastusiak et al. | 705/71 |
| 2007/0150744 A1* | 6/2007 | Cheng et al. | 713/185 |
| 2008/0234052 A1* | 9/2008 | Steil | 463/47 |
| 2009/0283589 A1* | 11/2009 | Moore et al. | 235/382 |

FOREIGN PATENT DOCUMENTS

JP  2007149010 A  *  6/2007

\* cited by examiner

*Primary Examiner*—Pierre E Elisca
(74) *Attorney, Agent, or Firm*—Schwegman, Lundberg & Woessner, P.A.

(57) ABSTRACT

A method and system to verify a transaction are described. The system may include a token generator to issue a client set of tokens to a client, a token verification list generator to issue a verification set of tokens to a provider, a communication module to receive a request from the provider to redeem a provider set of tokens, and a redemption module. The redemption module may be configured to compare the provider set of tokens with the client set of tokens and to selectively redeem the provider set of tokens based on the results of the comparison.

25 Claims, 9 Drawing Sheets

TRANSACTION_RECORD TABLE

| TRANSACTION ID | END DATE | PURCHASER (USER ID) | SELLER (USER ID) | ITEM NO# | TITLE | FEEDBACK |
|---|---|---|---|---|---|---|
| 62 | 64 | 66 | 68 | 70 | 72 | 73 |

*FIG. 5*

| 405 | 410 | 415 | 420 | 425 |
|---|---|---|---|---|
| ITEM CODE | ITEM DESCRIPTION | AVAILABLE UNITS | RESERVED FLAG | ITEM PRICE |

METHOD AND SYSTEM TO VERIFY A TRANSACTION

RELATED APPLICATIONS

This patent application claims the benefit of priority, under 35 U.S.C. Section 119(e), to U.S. Provisional Patent Application Ser. No. 60/755,205, entitled "Asynchronous Verification of Transaction," filed on Dec. 30, 2005, the contents of which are hereby incorporated by reference in its entirety.

TECHNICAL FIELD

This application is related to the field of cryptography and electronic commerce, and to method and system to verify a transaction in particular.

BACKGROUND

In a system where an untrusted provider gives a product or provides a service to an untrusted client on behalf of a third party, such as a trustee, the occurrence of a transaction may be verified synchronously or asynchronously. For example, confirmation of package delivery, coupon usage, and access privileges are common scenarios where both the client and provider may be unknown and/or untrusted by a third party (a trustee) who needs to verify a transaction. Where a trustee has a new or limited-trust relationship with the providing party, and it may sometimes be inconvenient, inefficient, or costly to synchronously communicate with the trustee during each transaction between a client and a provider.

Some existing systems use physical tokens or physical tickets to validate a transaction. For example, physical tokens may be used to operate a machine in a pet store. The pet store has tokens in the register that are sold to clients, who then put them in a machine that makes pet identification tags. The provider of the machine then redeems the tokens periodically (e.g., weekly or monthly) with the trusted pet store owner for cash. The pet store owner, who is the trustee, doesn't need to maintain or secure the provider's machine. The provider does not need to store money in her machine over long periods, which reduces the chances of theft. Since the tokens are valuable only to the pet store owner (trustee) or the provider, there is no incentive for outside parties to steal tokens from the machine. Because tokens are used, they can be tracked separately from general purchases of the pet store. The client purchasing tokens from the trustee, the client use of tokens to get the ID tags, and the eventual provider redemption of the tokens with the trustee are all asynchronous, meaning that they don't require all three parties' presence. Similar physical token and ticket systems are used for arcades, raffles, laundromats, subway admission systems, and slot machines to avoid fraud by untrusted employees acting as "providers" servicing machines and customers.

However, physical tokens may be counterfeited, the client may lose the tokens or may decide not to use them and therefore want a refund. On the other hand, the provider may counterfeit tokens and attempt to redeem the counterfeit tokens with the trustee.

Some existing systems utilize electronic currency, such as credit cards or gift cards. The use of credit cards or gift cards often requires synchronous communication with the trustee. For example, credit card transactions require that the provider electronically verifies that the funds will be reimbursed to a provider before products or services are released to a client.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A system and method to verify a transaction are described. In the following description, for purposes of explanation, numerous specific details are set forth in order to provide a thorough understanding of an example system and method to verify a transaction. It will be evident, however, to one skilled in the art that an example system and method may be practiced without these specific details.

Definitions a!: algebraic notation meaning to take the variable a and multiply it by every positive integer less than a. For example, $3! = 3 \times 2 \times 1 = 6$. Also, $5! = 5 \times 4 \times 3 \times 2 \times 1 = 20$.

Asynchronous: not requiring synchronous communication back and forth between the trustee and any other party.

Client: a party seeking a product or a service from a provider. May also be called $1^{st}$ party.

Provider: a party providing a product or a service to a client. May also be called $2^{nd}$ party.

Set: a group of one or more tokens. (35, 77, 91) is an example set of three two-digit numbers (tokens).

Superset: a set that includes a smaller set. (25, 27, 33, 35, 51, 52, 61, 77, 84, 91) is an example superset of a smaller set (35, 77, 91).

Token: a distinguishable item of information or object, including but not limited to number, a letter, a shape, a color, a size value, a symbol, a coin, or a weight value.

Transaction-specific: restricted to one or more specific trustees, providers, clients, products, and/or services.

Trustee: a trusted party believed to issue valid tokens and trusted verification lists. Trusted to sell to the client and redeem for the provider valid tokens it has issued. May also be called $3^{rd}$ party.

Overview of a Method to Verify a Transaction

In one example embodiment, a method to provide verification of a transaction involves a trustee, a provider, and a client. The trustee needs to verify that some transaction has occurred. The trustee issues two sets of tokens: a longer set and a shorter set. The trustee communicates the shorter set of tokens (a client set of tokens) to the client. The longer set is a superset of the shorter set (e.g., it includes all of the tokens from the client set of tokens as well as additional tokens). The trustee gives this longer set (a verification set of tokens) to the provider.

The provider and client then meet to complete the transaction. At the meeting, they compare their sets of tokens. The client and the provider verify that the verification set of tokens is a superset of the client set of tokens, e.g. that all of the tokens on the short set are also on the longer set. The provider thus obtains the client set of tokens from the client and can use these tokens as a provider set of tokens. The provider completes the transaction, and can then redeem the provider set of tokens with the trustee asynchronously at any time.

One embodiment of a method to provide verification of a transaction involves a client who receives a single random token and a provider who verifies that the token exists in a verification list. The verification list contains the valid token and some additional, invalid, tokens. For example, the client is issued the single token 5267. The provider is issued the verification list containing ten tokens (2232, 2730, 3211, 3311, 3824, 5267, 5973, 6069, 8790, 9981). When the client and provider meet, the provider looks through the list to determine if the token is in the list. The provider may have the numbers listed from top to bottom, and slide down a window until the correct number appears. This function may be utilized, as shown in this example, with a list that includes ordered tokens. In this example, the client has a 10 in 10,000 (or 1 in 1000) chance of randomly choosing a token which appears valid. On the other hand, the provider has a 1 in 10 chance of randomly choosing and redeeming a valid token with the trustee, without ever providing the item or service or getting the token from the client.

In another example embodiment, a client token may be embedded in a verification string. For example, the provider could verify the token 3824 is contained somewhere within the continuous verification string (8790331382463). The provider slides a window four digits wide over the verification string until the token is found or no token is found. In this example, the chance of the provider guessing the token is 1 in 10, but the size of the verification list is smaller.

The ordered-list version of transaction verification may require a large verification list. The string version of transaction verification may require a complex lookup procedure. An embodiment of transaction verification may be configured to utilize a combination of multiple tokens to verify a transaction, thus supporting a relatively short, ordered, easily searchable verification list.

Figure 2A:
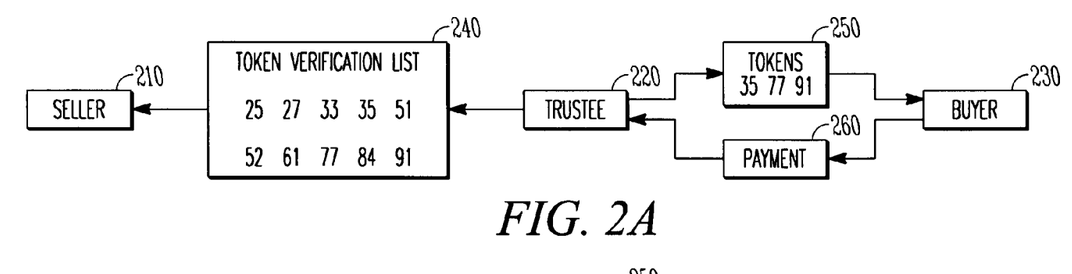
FIGS. 2A, 2B, and 2C show an example architecture to perform asynchronous verification of a transaction.
Figure 2B:
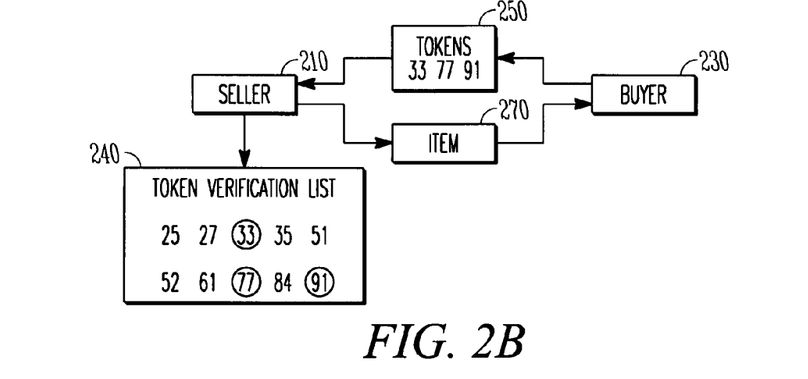
Figure 2C:
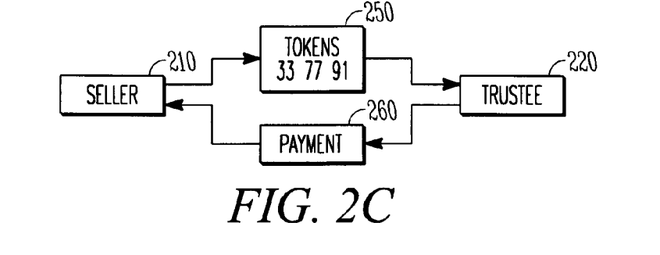

In one example embodiment, a trusted third party (e.g., the trustee) issues a list of numbers to a client and to a provider. The client receives the set of numbers (35, 77, 91) and the provider receives the numbers (25, 27, 33, 35, 51, 52, 61, 77, 84, 91). The provider is also notified that the client is to deliver to the provider exactly three valid tokens. The client and the provider meet to transact. The client and the provider compare lists, and the provider confirms that the client set of three tokens is a valid subset of the list of verification tokens. The provider therefore knows with high reliability that the tokens are valid and will be accepted by the trustee as a proof of the transaction. FIGS. 2A, 2B and 2C show this example with a marketplace operator (e.g., a provider of an on-line trading platform) as the trusted third party.

An example embodiment of a system to provide verification of a transaction utilizes virtual. Virtual tokens can be easily distributed, copies, or backed-up. Virtual tokens can also be verified easily, yet provide protection from counterfeiting of the tokens. In one example embodiment, a system to verify a transaction may be implemented such that no synchronous communication with a third party and no complex mathematical computation are required in order to perform validation of the tokens that are submitted to a trustee for redemption.

The system to perform asynchronous verification of a transaction, in one example embodiment, utilizes a form of transaction-specific virtual currency (e.g., asynchronous verification tokens) that provides a customizable level of asynchronously-verifiable counterfeit protection. The validity of such virtual currency may be verified, in one example embodiment, without contacting the entity that issues the virtual currency. The asynchronous verification tokens may be transaction-specific, and redeemable only by specified providers for specified transactions. Such transaction-specific asynchronous verification tokens may be termed a closed-loop form of virtual currency. In another example embodiment, the system and method to create asynchronous verification tokens may be implemented such that the system and the tokens, can be replicated without compromising the validity and reliability of the system.

Description of a Transaction Verification Flow

Figures 1, 1A:
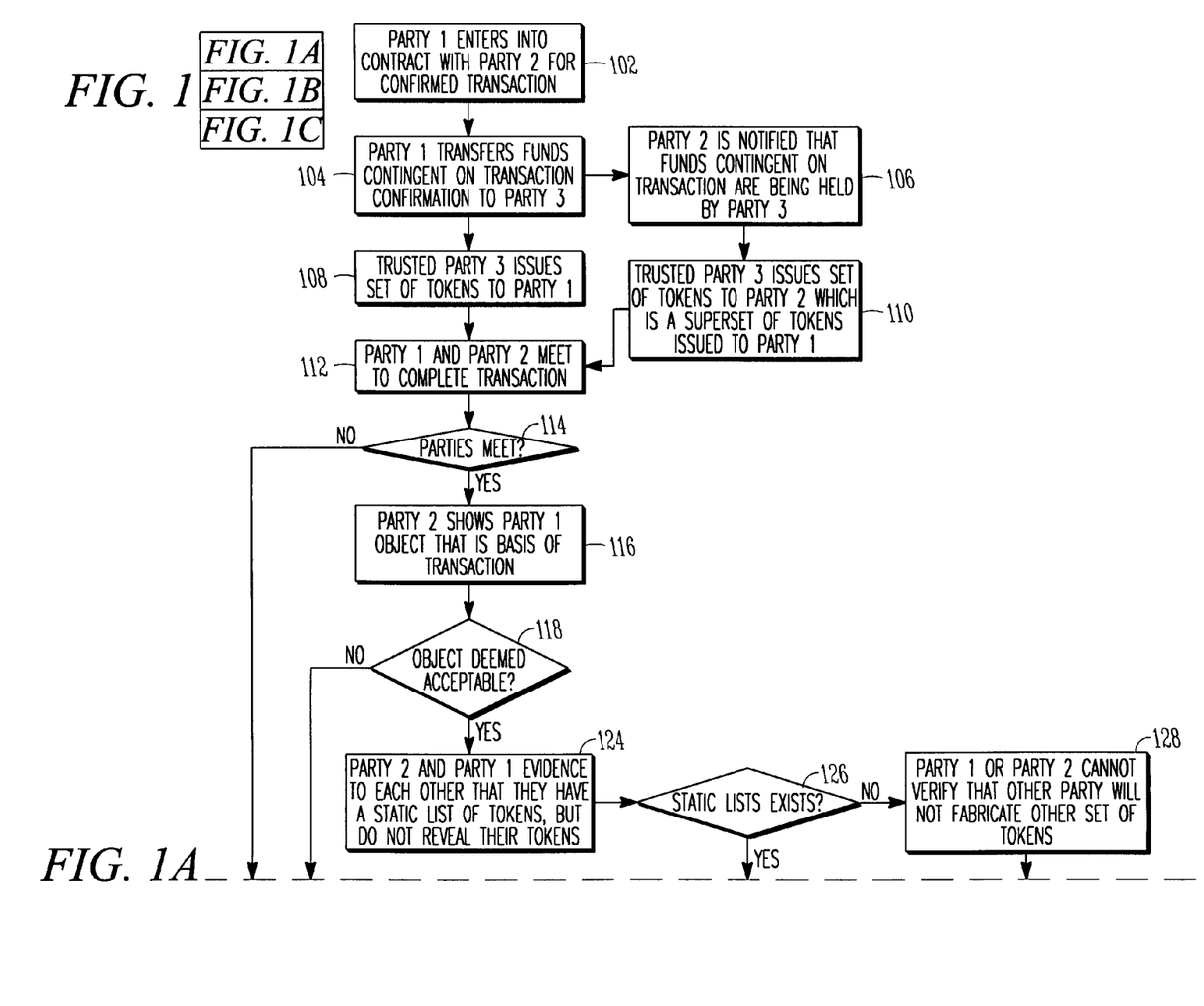
FIGS. 1A, 1B, and 1C show an example of a method to perform asynchronous verification of a transaction.
Figure 1B:
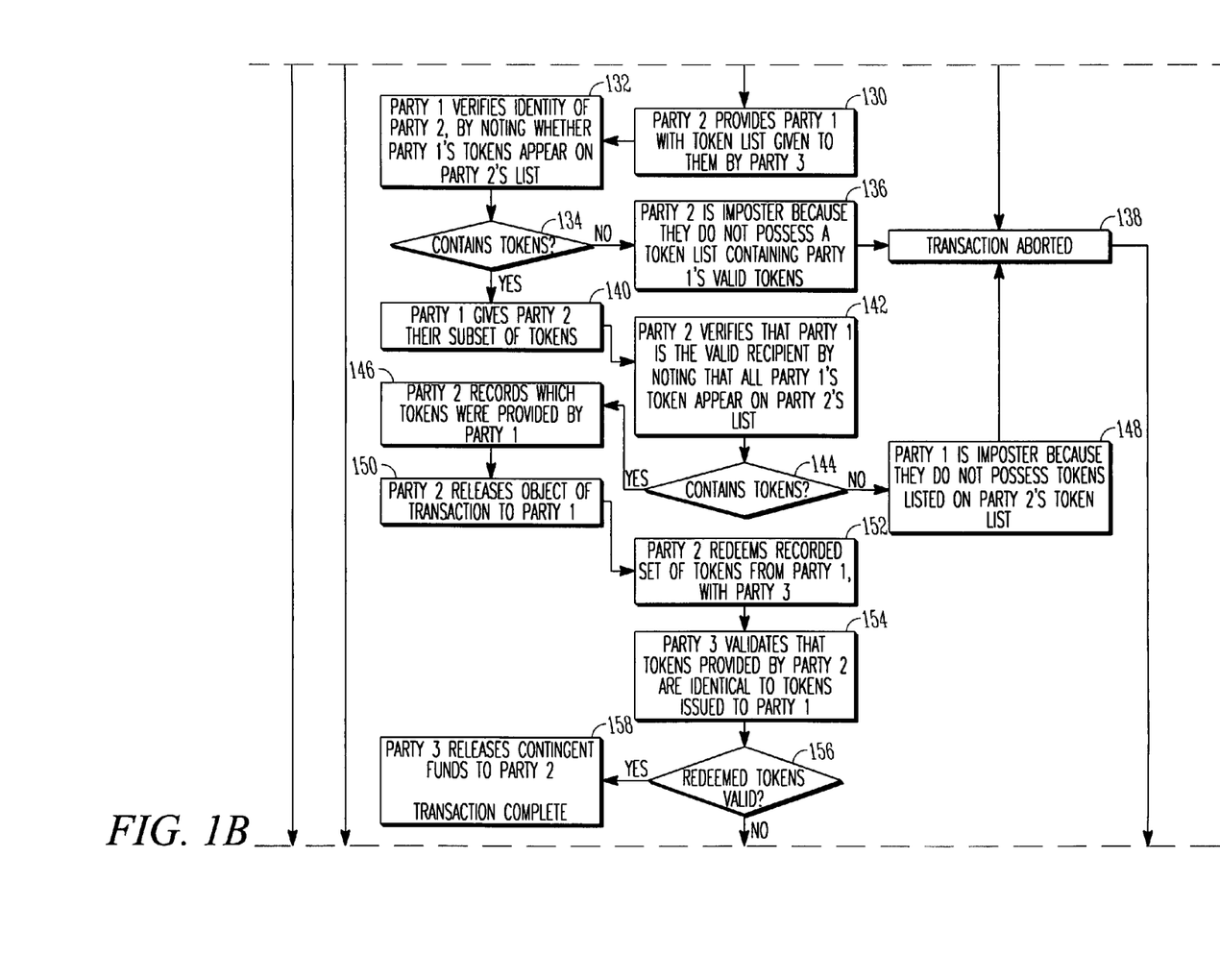
Figure 1C:
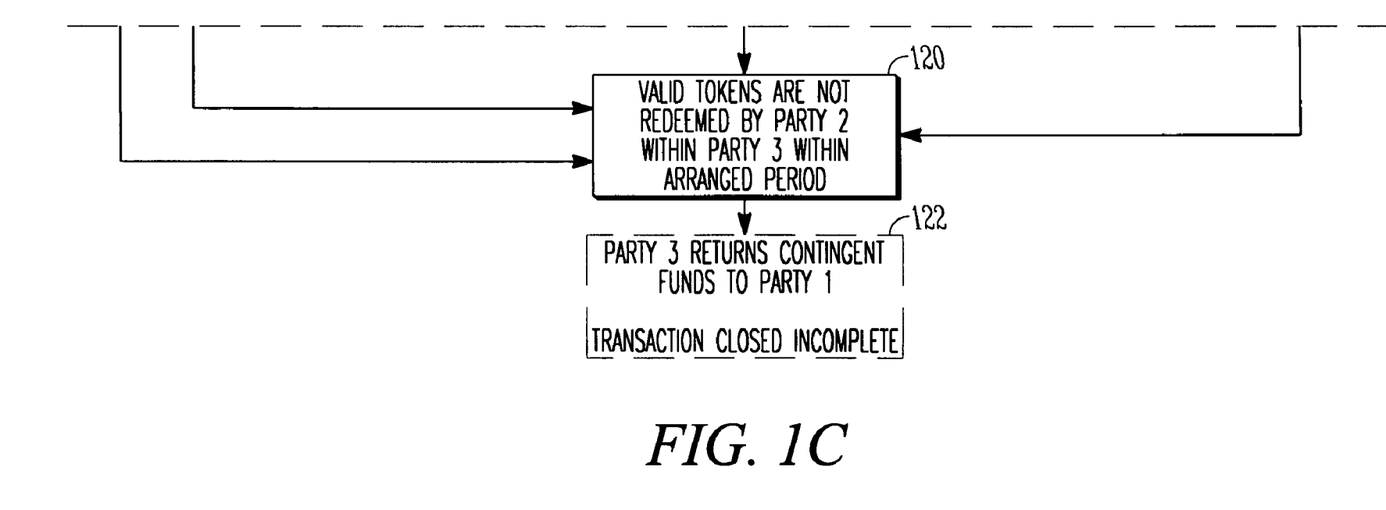

FIGS. 1A, 1B and 1C are flow diagrams of an example method to asynchronously verify a transaction when a provider is selling an object and an escrow mechanism is used. It will be noted, that the term "object" will be interpreted to include a service, as well as a physical object or item. In FIGS. 1A, 1B and 1C, party 1 is a client, party 2 is a provider, and party 3 is a trustee (e.g., a trusted third party). In FIGS. 2A, 2B and 2C, the client and the provider are noted as such, and a company (e.g., eBay, Inc. of San Jose, Calif., or any one of a number of escrow service companies) may operate as a trustee.

As shown in FIG. 1A, at 102, the transaction begins when a client ($1^{st}$ party) and a provider ($2^{nd}$ party) agree (e.g., via a contract) to complete an asynchronously verified transaction. At 104, the $1^{st}$ party transfers funds, contingent on asynchronous verification and confirmation of the transaction, to the $3^{rd}$ party. For example, if there is money, an object for trade, or information for the trustee ($3^{rd}$ party) to hold in escrow until the completion of the transaction, the client provides or transmits this to the trustee. At 106, the $2^{nd}$ party is notified that funds contingent on asynchronous verification of the transaction are being held by the $3^{rd}$ party. For example, the trustee notifies the provider in detail of the client's holdings in escrow.

At 108, the trusted $3^{rd}$ party issues a set of valid tokens (a set of client tokens) to the $1^{st}$ party. In some embodiments, the trustee also transmits to the client a set of terms for performing the asynchronous verification of a transaction. Examples of terms transmitted to the client may include the time limits (if any) for the transaction and escrow actions, the trustee policy for accepting tokens from the provider (e.g., the number of tokens required, the form of tokens, and if a partial set of tokens is acceptable), the trustee policy for where escrow contents are transferred upon inaction by both parties, the trustee policy for escrow contents given various actions by parties including redemption of tokens (in whole or part) by the provider and disputes by either party, a statement that revealing these tokens to the provider may be treated to indicate an approval of releasing escrow to the buyer, and a complete list of valid tokens. Contact information and meeting arrangements for the transaction may also be included.

At 110, the trusted $3^{rd}$ party issues a set of verification tokens to the $2^{nd}$ party. The set of verification tokens is a superset of the valid tokens issued to the $1^{st}$ party. In some embodiments, the trustee also transmits to the provider a set of terms for performing the asynchronous verification of a transaction. The terms transmitted to the provider may include the terms similar to the terms transmitted to the client, as described above.

At 112, the $1^{st}$ party and the $2^{nd}$ party agree to meet to complete the transaction. At 114, if parties meet, the process proceeds to 116. If the meeting is not completed, the process proceeds to 120, as shown in FIG. 1C, to abort the transaction. Returning to FIG. 1A, at 116, the $2^{nd}$ party shows the $1^{st}$ party the object that is the subject of the transaction. For example, the provider shows an object, such as an item to be purchased, or begins performing a service, for the client. At 118, the $1^{st}$ party decides whether the object is acceptable. If the $1^{st}$ party, or client, accepts the object or service, the process proceeds to 124. If the object or service is unacceptable, the process proceeds to 120 shown in FIG. 1C to abort the transaction.

At 120, valid tokens are not redeemed by the $2^{nd}$ party within a time period set by the $3^{rd}$ party. For example, when tokens have not been redeemed by the provider within the agreed time period of time, the asynchronous verification of the transaction is aborted. It should be noted that, if agreed upon by both parties, this policy may be changed so that the default behavior is that the escrow goes to the provider unless the client actively asks for an aborted transaction (and refund of escrow) and the provider has not submitted tokens within the agreed period. At 122, the $3^{rd}$ party returns the contingent funds to the $1^{st}$ party, and the asynchronous verification of the transaction is closed as incomplete. For example, the trustee returns the funds, trade item, or information that was held in escrow to the client, and the asynchronous verification of the transaction is closed as incomplete.

Returning to FIG. 1A, at 124, the $1^{st}$ party and the $2^{nd}$ party provide evidence to each other that they each have a static list of tokens (but they do not reveal their tokens). For example, the client and provider verify each has a static list of tokens by showing a portion of the token list (e.g., printed out or in an unchangeable written form). At 126, a determination is made as to whether both parties have valid static lists. If not, the process proceeds to 128. At 128, either the $1^{st}$ party or the $2^{nd}$ party or both parties cannot verify that the other party has a valid static list of tokens. For example, if one party cannot verify that the other party has not fabricated the other set of tokens, the process proceeds to 138 (as shown in FIG. 1B) to abort the transaction. If both parties have valid static lists at 126, the process proceeds to 130 (as shown in FIG. 1B).

At 130, the $2^{nd}$ party provides the $1^{st}$ party with the list of verification tokens given to the $2^{nd}$ party by the $3^{rd}$ party. For example, the provider gives the client the static list of verification tokens. At 132, the $1^{st}$ party verifies the identity of the $2^{nd}$ party, by noting whether the $1^{st}$ party's tokens appear on the list of verification tokens provided by the $2^{nd}$ party. For example, the client checks if the verification list contains all of the valid tokens that the client received from the trustee. At 134, if the verification list does not contain all of the valid tokens, the process proceeds to 136. If the verification list contains all of the valid tokens, the process continues to 140. At 136, the $2^{nd}$ party is probably an imposter or attempting to commit fraud, because the $2^{nd}$ party does not possess a list of verification tokens that contain all of the valid tokens in the list held by the $1^{st}$ party. Because the $2^{nd}$ party is not a trustworthy provider, the process proceeds to 138. At 138, the asynchronous verification of the transaction is aborted, and the process continues to 120 and 122 to close the asynchronous verification of the transaction as incomplete as discussed above.

At 140, the $1^{st}$ party gives the $2^{nd}$ party their subset of tokens. For example, the client gives the static list of valid tokens to the provider. At 142, the $2^{nd}$ party attempts to verify that the $1^{st}$ party is the valid recipient of the object that is the basis of the transaction by determining whether all of the tokens on the $1^{st}$ party's list appear on the $2^{nd}$ party's list. For example, the provider attempts to identify all of the client's tokens on the verification list. At 144, a determination is made as to whether all of the tokens on the client's list are present on the provider's list. Following a positive determination at 144, the process proceeds to 146. Following a negative determination at 144, the process proceeds to 148 (transaction aborted).

At 146, the $2^{nd}$ party records which tokens were provided by the $1^{st}$ party. For example, the provider can mark the tokens on the verification list that are also valid client tokens from the client's list. The process proceeds to 150. At 148, the $1^{st}$ party, or client, may be identified as an imposter as a result of not possessing tokens listed on the $2^{nd}$ party's, or provider's, token list, and the process proceeds to 138 (transaction aborted). At 150, because the $2^{nd}$ party has the valid list of tokens, the $2^{nd}$ party releases the object that is the basis of the transaction to the $1^{st}$ party. For example, the provider gives the item or completes the service for client. At 152, the $2^{nd}$ party redeems the recorded set of valid tokens that he received from the $1^{st}$ party with the $3^{rd}$ party. For example, the provider redeems the valid tokens with the trustee.

At 154, the $3^{rd}$ party validates that the tokens provided by the $2^{nd}$ party (a set of provider tokens) are identical to the valid tokens that were issued to the $1^{st}$ party. For example, the trustee determines whether the tokens sent by the provider are identical to tokens that it sent to client. At 156, a determination is made as to whether the redeemed tokens are valid. If yes, the process proceeds to 158. If not, the process proceeds to 120. At 158, the $3^{rd}$ party releases the contingent funds to the $2^{nd}$ party, and records the asynchronous verification of the transaction as complete. For example, the trustee releases the contents of the escrow account to the provider to complete the asynchronous verification of the transaction.

FIGS. 2A, 2B and 2C show an example of a transaction to purchase an item. As shown in FIG. 2A, the client, or buyer, 230, deposits payment funds 260 in escrow with a trustee 220 for the transaction. The trustee 220, for example eBay, Inc., transmits a valid token list 250 to the buyer 230 and a token verification list 240 to the provider, or seller, 210. (As shown in FIG. 2A, the seller 210 and the buyer 230 do not see each others lists). As shown in FIG. 2B, the buyer 230 meets with the seller 210. At the meeting, the seller 210 exchanges the item 270 for the tokens 240. The seller 210 compares the token list 250 with the token verification list 240. The tokens in the token list 250 are also present in the token verification list 240. Therefore, the seller 210 is confident that the buyer has deposited a payment in escrow, and gives the item 270 to the buyer. In this example, as with a cash transaction, the exchange of tokens (or virtual money) and the item happens nearly simultaneously. The parties then part. As shown in FIG. 2C, the seller 210 redeems the tokens 250 with the trustee 220 to receive the payment 260 of escrow funds.

Analysis of Reliability and Fraud Detection

The reliability of an example system to asynchronously verify a transaction the system may be affected by several factors. The first factor is r, the range of the possible tokens. Although duplicate tokens are possible when using asynchronous verification for simplicity of explanation, assuming all tokens are distinct, then r is just the number of distinct possible tokens. In the example in FIGS. 2A, 2B and 2C, r=100, since the tokens (numbers) 0 through 99 are possible. The second factor is m, the number of matching (valid) tokens, in a sense this is the virtual money. In the example in FIGS. 2A, 2B and 2C, m=3, since the client list and the number of tokens expected by the provider are both 3. The third factor is n, the number of items in the larger list which includes valid tokens and false tokens.

An example embodiment of asynchronous verification reliability and fraud prevention, as described herein, may seek to rely on a subtle fact that there are many possible ways to choose a few items from a larger set of items. Formally, the number of combinations of m items from a larger superset of n items is stated as n choose m, which is $n!/(n-m)! \times m!$. From FIGS. 2A, 2B and 2C, the chance of the provider correctly guessing the three tokens from her list of 10 tokens is remote. This is true because there are $10!/(7! \times 3!) = 3,628,800/(5040 \times 6) = 120$ possible combinations of 3 tokens from the list of 10 tokens. This means the provider would have only a 1 in 120 chance of randomly picking all 3 valid tokens from his list and fraudulently submitting them to the trustee.

If the provider is simply given all of the information (e.g., a list of the valid tokens), the provider may have little incentive to complete the transaction. But without any of the information about the validity of the client tokens, the provider has no way to verify the transaction. An example system to perform asynchronous verification of a transaction allows the provider to asynchronously (e.g., without communication with the trustee) validate the tokens without being able to counterfeit the tokens himself.

Also subtle is how client fraud may be reduced. The chance of the client successfully guessing some tokens from the provider's list which are not the valid tokens may be estimated as less than n/r for each token picked. In one example embodiment, the chance of choosing m tokens which appear valid but which are all invalid is $(n-m)!(r-2m)!/(r-m)!(n-2m)!$. For the example, in FIGS. 2A, 2B and 2C, this chance is $7!94!/97!4!=(7 \times 6 \times 5)/(97 \times 96 \times 95)=210/884,640=0.000237$ which is less than one chance in 4000.

But a fraudulent client could falsify only one of the tokens, instead of all three. The chance of successfully falsifying one token is $(n-m)/(r-m)$, which is significantly higher. For the example in FIGS. 2A, 2B and 2C, this is 7/97=0.072 or about one chance in 13. A system to asynchronously verify a transaction, in one example embodiment, may be configured to handle this case by modifying the acceptance policy of the trustee. Instead of only accepting the tokens from the provider if all tokens are valid, the trustee can instead choose to accept tokens if at least two out of three (or even just one out of three) are matching, thereby reducing the chance of successful client fraud. The tradeoff here is that a trustee acceptance policy then increases the chance of successful provider fraud, since the provider would now need to choose fewer tokens from her list to fraudulently claim the transaction was completed. Another factor in the acceptance policy is the number of attempts the trustee will allow per transaction. Allowing three attempts to redeem tokens forgives possible erroneous entries, but also increases the number of chances to try to redeem false tokens (if a provider tries to commit fraud).

One feature of a system to provide asynchronous verification of a transaction, in an example embodiment, is a concept of an acceptance policy. At token redemption, if some tokens are invalid, the trustee may evaluate whether the false tokens are due to error, client fraud, or provider fraud. Based on each situation, the trustee may choose to change the numbers for n, and m, and r or change the acceptance policy to minimize fraud and errors, without creating an overly burdensome system.

So the choices for n, and m, and r should be chosen by the trustee to provide the desired level of fraud protection given a certain acceptance policy, and a certain error rate. If these numbers are too large, the system may become overly complex and the numbers transmitted (especially if done manually) may be copied erroneously. If the acceptance policy is too liberal, fraudulent tokens may be accepted by the trustee. If the acceptance policy is too strict, providers may mistakenly accept fraudulent tokens from clients.

A system to verify a transaction, in an example embodiment, may be implemented as a low-complexity system for verifying transactions to a third party. The system may be implemented to be general enough to be used to verify transactions requiring very high or very low levels of reliability of verification. An example system to asynchronously verify a transaction may also be configured to provide robust fault tolerance and flexibility of use to include many clients or many providers. Asynchronous verification, in one example embodiment, may be transaction-specific, for one-time use, and low-complexity.

Public-key cryptography is different in that it uses synchronous communication and complex, automated calculation to ensure very high levels of security, and allow this security for multiple sequential transactions. Such a system may be complex to implement and understand. Because of its complexity and reliance on automation, it is not transparent. A client or provider does not know if the technology is only completing the calculation, or if it is also copying the entered codes for use during a subsequent fraudulent transaction.

Physical tokens, such as a pet ID tag machine tokens, are physical rather than virtual, and can be lost or physically counterfeited to provide multiple payments. Although the asynchronous verification tokens can be replicated (as they are only information, and not physical), the verification tokens may be designed to only validate a transaction once (if the provider decides that is how they should be accepted) and can be tied specifically to a particular client, provider, trustee trio.

A system to verify a transaction, in one example embodiment, may be configured to reduce the probability of providers or clients utilizing fraudulent tokens (e.g., tokens that have not been issued by a trustee). The probability of successfully committing fraud may be manipulated by adjusting the combination of tokens.

It will be noted that, in one example embodiment, a system to verify a transaction may permit redemption of tokens by an untrusted provider to the trusted third party, without the need to establish trust between the provider and the trustee (e.g., in the form of electronic means of verification).

Applications of a Transaction Verification Process

Although verification of a transaction can involve physical items and exchange of money, in general, the transaction may be any exchange of products or services, or where the trustee may want to verify the transaction occurred for other reasons (court mandated actions, employee completion of a task, etc.). The concepts of provider, client, and trustee are tied only to the roles performed during the execution of transaction verification. Additionally, there is no restriction that there is only one client, one provider, or one trustee. Below are some additional examples of applications for a system to verify a transaction asynchronously.

I. Verification of Meeting Attendance

A parolee receives tokens at the end of a mandatory counseling session, which she verifies asynchronously using her verification list, and then redeems these tokens to a court as proof the session was completed. In this case, the court is the trustee, and has issued tokens to the counselor (client), and a verification list to the parolee (provider). The parolee "provides" her attendance at the counseling sessions.

II. Copying and Distributing Tokens

An automobile association (trustee) issues "tow" insurance to a client, and gives the client appropriate tokens. The trustee also gives a validation list of tokens to a tow company. The client gives copies of the tokens to his wife and daughter. Only the first "client" of the three to use the tokens with the tow company will be validated successfully and gets a tow.

III. Tokens Accepted by Multiple Providers

A company (trustee) issues "rewards" coupons, each with distinct tokens, to employees (clients) for $10 off a purchase at a local clothing provider. The company will reimburse the provider $5 for each coupon redeemed. For example:
   Client 1: 35, 77, 91
   Client 2: 25, 27, 96
   Client 3: 33, 51, 99
   Provider: 11, 14, 17, 25, 27, 33, 35, 51, 52, 61, 77, 84, 91, 96, 99

The provider may use a consolidated verification list, which includes all of the valid tokens, instead of a separate validation list for each client. The false tokens on the validation list may provide protection against seller fraud regardless of the number of clients. Note, however, that this example may be subject to client fraud by collusion, however, if the clients join their information and present the tokens 91, 96, 99. This combination will be accepted by the provider, but will not be redeemed by the trustee as valid. A consolidated list may be appropriate if clients have nothing to gain by collusion (such as when clients benefit from token redemption but are not penalized by the provider redemption through the trustee).

IV. Delivery Confirmation

A bicycle delivery girl (provider) contracts with sellers (trustees) to deliver packages to various clients. Each package has the validation list taped to the package, and each client has tokens. The delivery girl verifies the tokens when delivering the package, and records the tokens. At the end of the day, the girl proves that the packages were delivered correctly by transferring the tokens to each of the sellers.

V. Escrow Under Presumption Transaction Will Not Complete

The client provides money to the trustee to be held in escrow until completion of a transaction with a provider. The trustee provides tokens to the client and the verification list to the provider. At the transaction, the provider gives the item or service, and receives the tokens from the client. The provider then redeems the tokens with the trustee. If the tokens are not redeemed by the provider (and funds transferred to the provider) by a certain time agreed by all parties, the escrow funds are released back to the client.

VI. Escrow Under Presumption Transaction Will Complete Successfully

The escrow proceeds as in Example V, but the acceptance policy is different. At the end of an agreed upon transaction period, if the client has not requested a refund, the escrow funds are transferred to the provider. If the client has requested a refund, and the provider has not redeemed tokens, the client funds are refunded by the trustee.

VII. Confirmation of Customer Local Pick-up

A standard "brick-and-mortar" store allows partners to drop off items it will then photograph and sell in an online auction (as a virtual consignment). At the end of the auction, some purchasers (clients) come in person to pick up items from the store (provider). The partner issues a valid token list to the purchaser (client) and a token validation list to the store (provider). When the item is picked up by the purchaser, the store validates and records the tokens to prove to the partner that the item was given to the purchaser. Alternatively, the online auctioneer, acting as a proxy for the partner, can issue the valid token list to the purchaser and the validation list to the store.

Transaction Facility

For the purposes of the present specification, the term "transaction" shall be taken to include any communications between two or more entities and shall be construed to include, but not be limited to, commercial transactions including sale and purchase transactions, auctions and the like.

Figure 3:
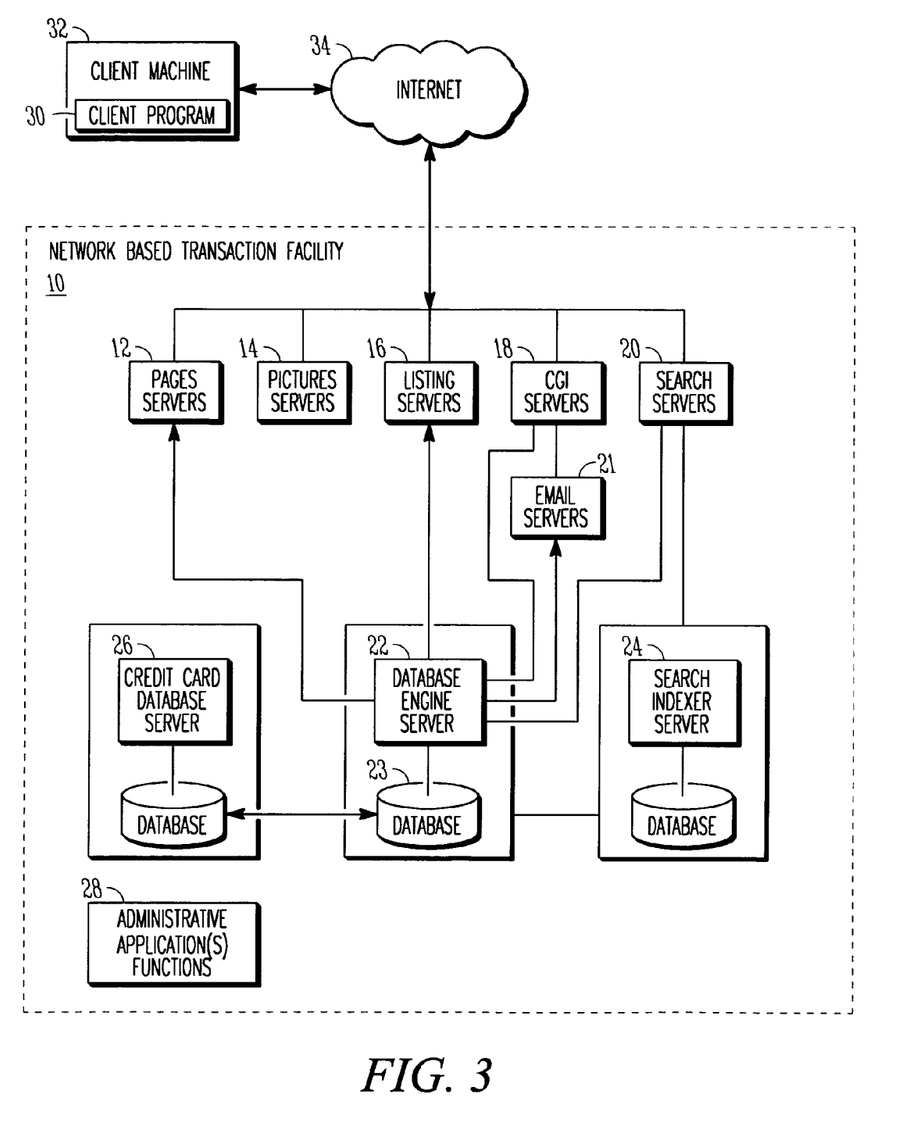
FIG. 3 is a block diagram illustrating an example network-based transaction facility.

FIG. 3 is block diagram illustrating an example network-based transaction facility 10 that includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 4:
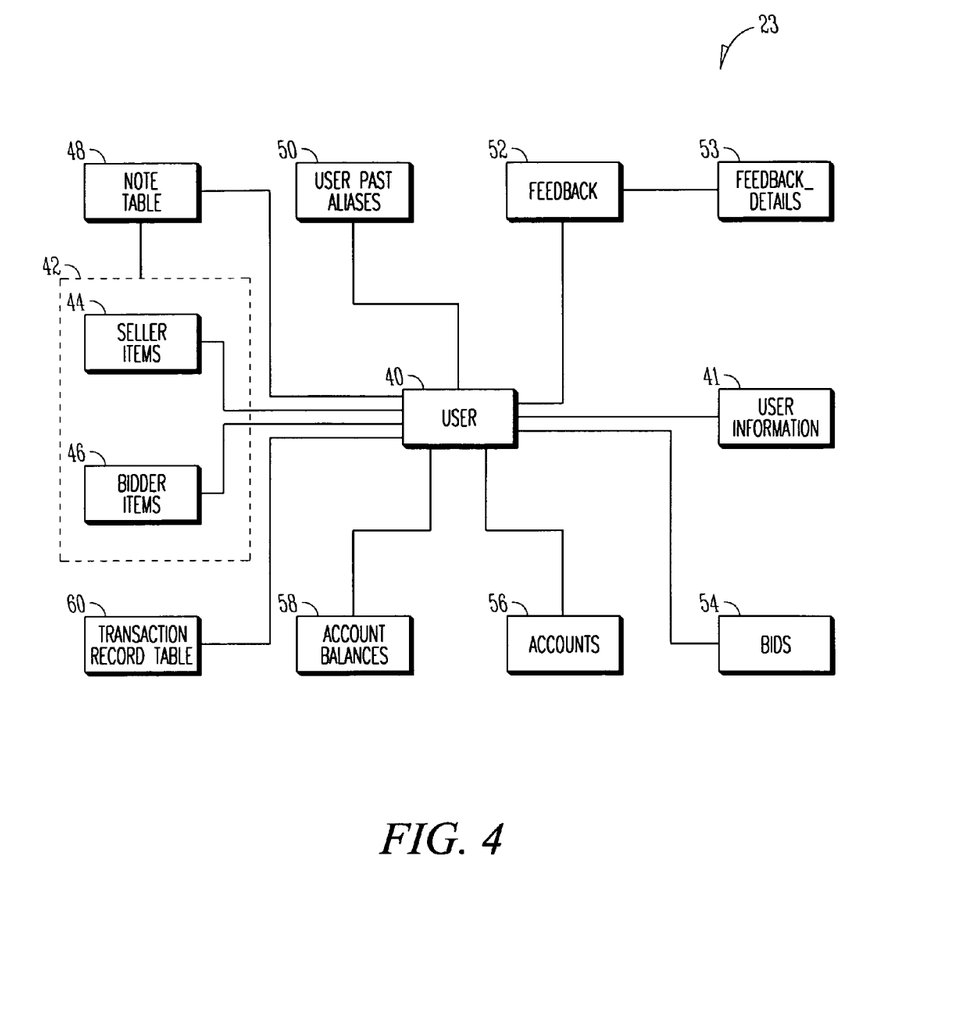
FIG. 4 is a schematic diagram illustrating an example database associated with the network-based transaction facility of FIG. 3.

FIG. 4 is a database diagram illustrating an example database 23, maintained by and accessed via the database engine server 22, which at least partially implements and supports the network-based transaction facility 10 such as an Internet-based auction facility, an E-commerce facility, a network-based payment service provider, and/or a network-based publication facility.

The database 23 may, in one embodiment, be implemented as a relational database, and may include a number of tables having entries, or records, that are linked by indices and keys. In an alternative embodiment, the database 23 may be implemented as a collection of objects in an object-oriented database.

Central to the database 23 is a user table 40, which contains a record for each user of the network-based transaction facility 10. A user may operate as a seller, a buyer, or both, within the facility 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a buyer with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being offered via the facility 10, or to a user of the facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 5:
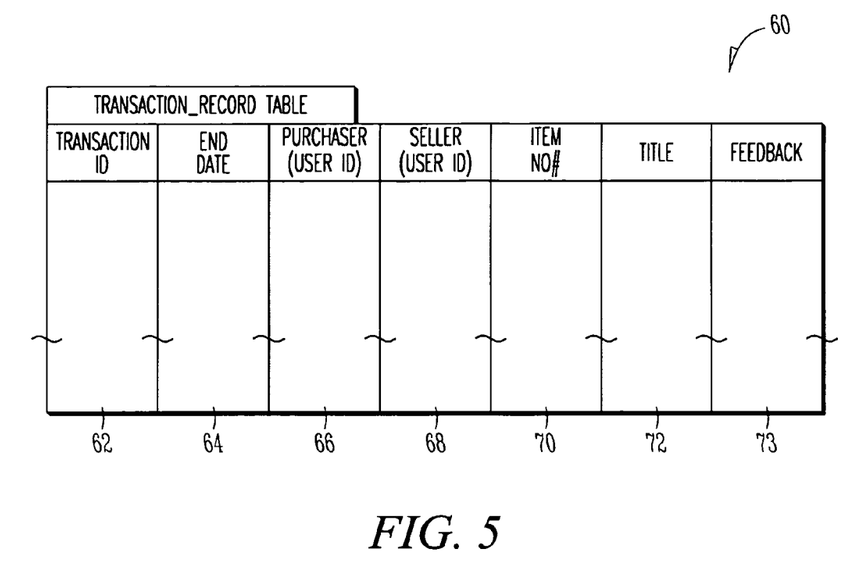
FIG. 5 is a diagrammatic representation of an example transaction record table.

FIG. 5 is a diagrammatic representation of an example embodiment of the transaction record table 60 that is populated with records, or entries, for completed, or ended, transactions that have been facilitated by the facility 10. The table 60 includes a transaction identifier column 62 that stores a unique transaction identifier for each entry, and an end date column 64 that stores a date value indicating, for example, a date on which a transaction was established. A purchaser column 66 stores a user identifier for a purchaser, the user identifier comprising a pointer to further user information stored in the user table 40. Similarly, a seller column 68 stores, for each entry, a user identifier for a seller within the relevant transaction. An item number column 70 stores, for each entry, an item number identifying the goods or service being transacted, and a title column 72 stores, for each entry, a descriptive title for the relevant transaction or for the item being transacted. A feedback column 73 stores, for each entry, data specifying whether feedback exists for the relevant transaction and whether this feedback is current (i.e., has not been removed or withdrawn).

It should be noted that, in one embodiment, an entry is only created in the transaction record table 60 for transactions that have been established by some offer and acceptance mechanism between the purchaser and the seller.

Figure 6:
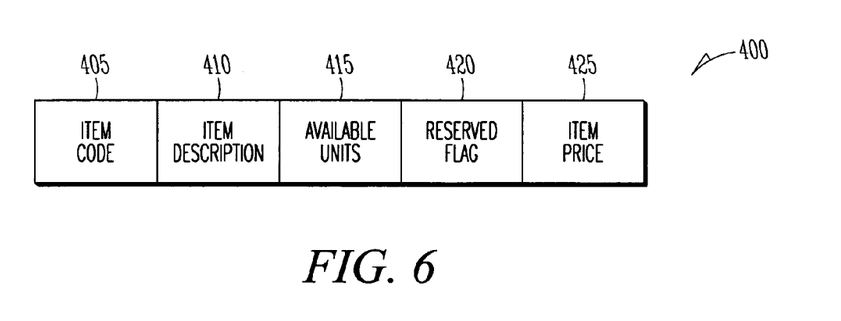
FIG. 6 is a diagrammatic representation of an example item database.
Figure 7:
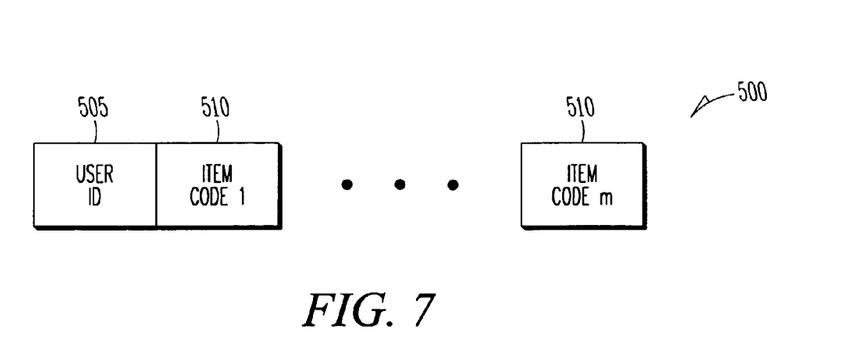
FIG. 7 is a diagrammatic representation of an example shopping cart database.

FIG. 6 illustrates an example embodiment of an item data base 400. In an embodiment, the seller items table 44 of FIG. 4 uses this structure. Referring to FIG. 6, the item database 400 includes an item identifier or code 405, an item description 410, an available units field 415, a reserved flag 420, and an item price field 425. FIG. 7 illustrates an example embodiment of a shopping cart database record 500. The shopping cart database record includes a user id code 505, and one or more item identifiers or codes 510 corresponding to each item that a user has placed into his cart. The item identifier field may be used to relate each item in a user's shopping cart to the record for that item in the item database 400.

Computer System

Figure 8:
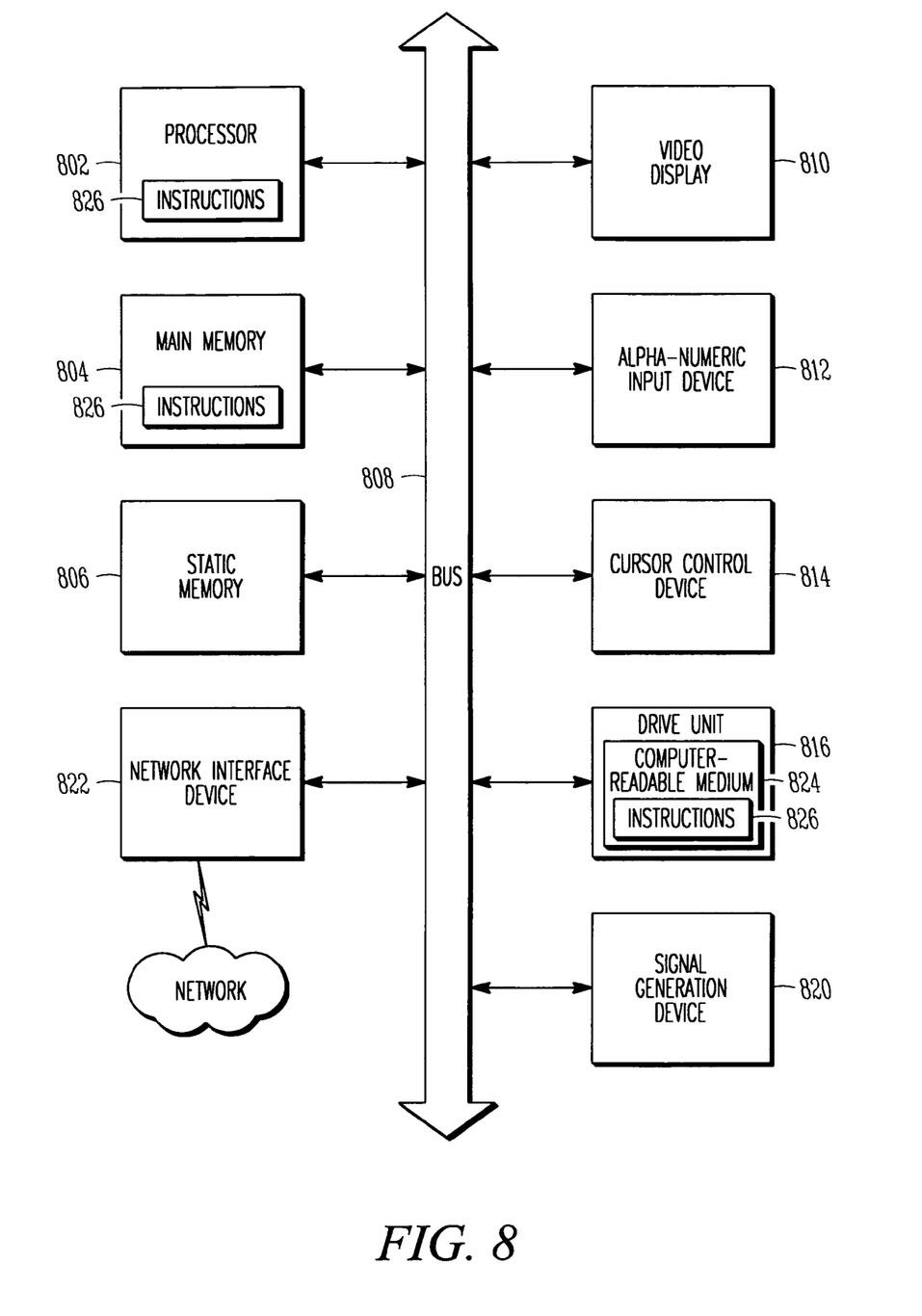
FIG. 8 illustrates an example computer system upon which one or more order processing and confirmation embodiments may execute.

FIG. 8 shows a diagrammatic representation of a machine in the example form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g. a keyboard), a cursor control device 814 (e.g. a mouse), a disk drive unit 816, a signal generation device 820 (e.g. a speaker) and a network interface device 822.

The disk drive unit 816 includes a machine-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Figure 9:
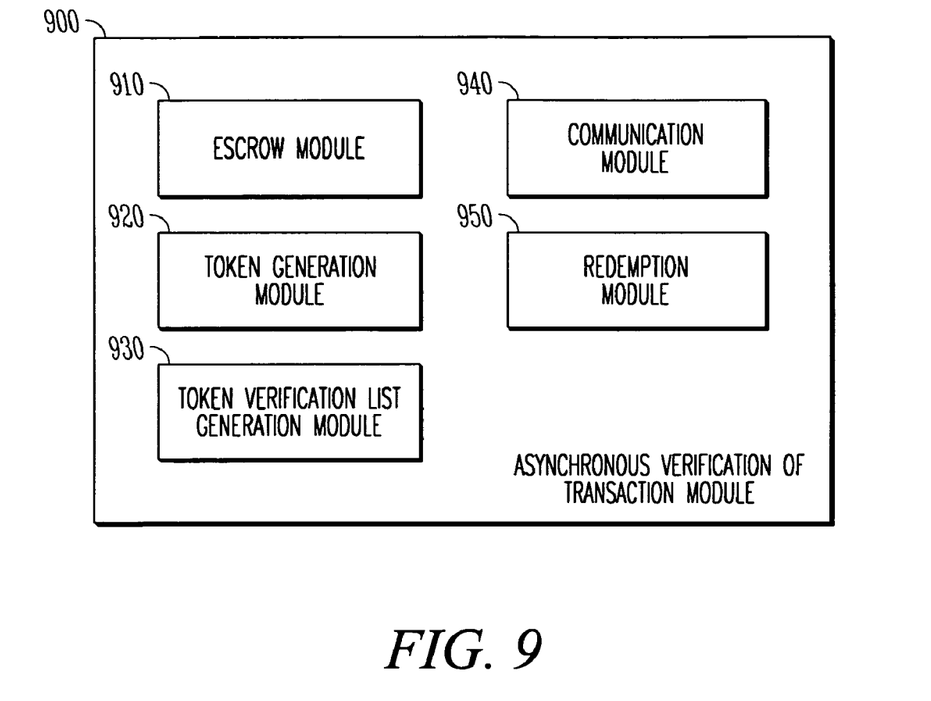
FIG. 9 is a diagrammatic representation of an example machine in the form of a computer system within which a set of instructions, for causing the machine to perform any one or more of the methodologies discussed herein, may be executed.

FIG. 9 is a diagrammatic representation of an example system for performing asynchronous verification of a transaction. In this embodiment, the system is used by a $3^{rd}$ party to generate a token list, a token verification list, to hold funds in escrow, to redeem tokens, and to release funds from escrow. A communication module 940 allows the $3^{rd}$ party to communicate with the $1^{st}$ and $2^{nd}$ parties. The escrow module 910 receives and stores funds received from the $1^{st}$ party in escrow. The token generation module 920 generates valid tokens that are sent to the $1^{st}$ party. The token verification list generation module 930 generates a token verification list that is sent to the $2^{nd}$ party. The redemption module 950 redeems tokens sent by the $2^{nd}$ party, and authorizes the release of funds from the escrow module 910 to the $2^{nd}$ party.

Thus, a system and method for asynchronous verification have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
    a token generator associated with a third party to issue a client set of tokens to a client;
    a token verification list generator associated with the third party to issue a verification set of tokens to a provider;

a communication module to receive a request from the provider to redeem a provider set of tokens;
a redemption module to:
compare the provider set of tokens with the client set of tokens, and selectively redeem the provider set of tokens, based on the results of the comparison.

2. The system of claim 1, further including an escrow module to receive funds from the client, the funds being associated with a transaction between the client and the provider, wherein the token generator is to issue the client set of tokens in response to the received funds.

3. The system of claim 2, wherein the redemption module is to authorize release of the funds associated with the transaction to the provider in response to the request to redeem the provider set of tokens.

4. The system of claim 1, wherein the client set of tokens is a subset of the verification set of tokens.

5. The system of claim 1, wherein the redemption module is to redeem the provider set of tokens if the provider set of tokens matches the client set of tokens.

6. The system of claim 1, wherein the selectively redeeming the provider set of tokens includes denying the request if the provider set of tokens does not match the client set of tokens.

7. The system of claim 1, wherein the redemption module is to process the request based on an acceptance policy.

8. The system of claim 7, wherein the acceptance policy includes denying the request if the request is made after a predetermined period of time subsequent to the time of issuing of the client set of tokens.

9. The system of claim 1, wherein the provider is a provider of goods.

10. The system of claim 1, wherein the set of client tokens includes one or more numerical identifiers.

11. The system of claim 1, wherein the redemption module is to invalidate the client set of tokens in response to the redeeming of the provider set of tokens.

12. A method comprising:
issuing, from a third party, a client set of tokens to a client;
issuing, from the third party, a verification set of tokens to a provider;
receiving a request from the provider to redeem a provider set of tokens;
comparing the provider set of tokens with the client set of tokens; and
selectively redeeming the provider set of tokens based on the results of the comparing.

13. The method of claim 12, wherein the issuing of the client set of tokens is in response to receiving funds from the client, the funds being associated with a transaction between the client and the provider.

14. The method of claim 13, wherein the satisfying of the request includes releasing the funds associated with the transaction between the client and the provider to the provider.

15. The method of claim 12, wherein the client set of tokens is a subset of the verification set of tokens.

16. The method of claim 12, wherein the selectively satisfying of the request includes redeeming the provider tokens if the provider set of tokens matches the client set of tokens.

17. The method of claim 12, wherein the selectively satisfying of the request includes denying the request if the provider set of tokens does not match the client set of tokens.

18. The method of claim 12, wherein selectively redeeming of the provider set of tokens is in accordance with an acceptance policy.

19. The method of claim 18, wherein selectively satisfying of the request is in accordance with an acceptance policy includes denying the request if the request is made after passage of a predetermined period of time following the time of issuance of the client set of tokens.

20. The method of claim 12, wherein the provider is a provider of goods.

21. The method of claim 12, wherein the set of client tokens includes one or more numerical identifiers.

22. The method of claim 12, further including invalidating the client set of tokens in response to the redeeming of the provider set of tokens.

23. A machine-readable medium having instruction data to cause a machine to:
issue, from a third party, a client set of tokens to a client;
issue, from the third party, a verification set of tokens to a provider;
receive a request from the provider to redeem a provider set of tokens;
compare the provider set of tokens with the client set of tokens; and
selectively redeeming the provider set of tokens based on the results of the comparison.

24. A system comprising:
means for issuing, from a third party, a client set of tokens to a client;
means for issuing, from the third party, a verification set of tokens to a provider;
means for receiving a request from the provider to redeem a provider set of tokens;
means for comparing the provider set of tokens with the client set of tokens; and
means for selectively redeem the provider set of tokens based on the results of the comparing.

25. A method comprising:
issuing, from a third party, a client set of tokens to a client;
issuing, from the third party, a verification set of tokens to a provider, the verification set of tokens and the client set of tokens having a relationship to provide an indication to the provider that the client set of tokens is suitable for redeeming the client set of tokens with a trustee;
receiving a request from the provider to redeem a provider set of tokens;
determining that the provider set of tokens corresponds to the client set of tokens; and
selectively redeeming the provider set of tokens.

* * * * *